United States Patent
Qin et al.

(10) Patent No.: US 12,483,346 B2
(45) Date of Patent: Nov. 25, 2025

(54) DATA SECRECY METHOD FOR SUBMARINE CABLE SYSTEM WITH FAILURE AND SUBMARINE CABLE SYSTEM

(71) Applicant: HMN Technologies Co., Limited, Tianjin (CN)

(72) Inventors: Xiaoyong Qin, Tianjin (CN); Li Yang, Tianjin (CN); Jianping Li, Tianjin (CN)

(73) Assignee: HMN Technologies Co., Limited, Tianjin (CN)

(*) Notice: Subject to any disclaimer, the term of this patent is extended or adjusted under 35 U.S.C. 154(b) by 285 days.

(21) Appl. No.: 18/384,077

(22) Filed: Oct. 26, 2023

(65) Prior Publication Data

US 2025/0023654 A1  Jan. 16, 2025

(30) Foreign Application Priority Data

Jul. 14, 2023 (CN) .......................... 202310860532.1

(51) Int. Cl.
*H04B 10/00* (2013.01)
*H02G 1/10* (2006.01)
*H04J 14/02* (2006.01)
*H04J 14/00* (2006.01)

(52) U.S. Cl.
CPC ........... *H04J 14/0212* (2013.01); *H02G 1/10* (2013.01)

(58) Field of Classification Search
CPC ...... H04B 10/03; H04B 10/032; H04B 10/80; H04B 10/85
See application file for complete search history.

(56) References Cited

U.S. PATENT DOCUMENTS

| | | | |
|---|---|---|---|
| 2018/0219619 A1* | 8/2018 | Takigawa | H04Q 11/0005 |
| 2019/0253139 A1* | 8/2019 | Satou | H04J 14/0305 |
| 2020/0259584 A1* | 8/2020 | Ugajin | H04B 10/85 |
| 2021/0067264 A1 | 3/2021 | Abe | |

FOREIGN PATENT DOCUMENTS

| | | |
|---|---|---|
| CN | 101030820 A | 9/2007 |
| CN | 103190094 A | 7/2013 |
| CN | 103493413 A | 1/2014 |
| CN | 104904140 A | 9/2015 |

(Continued)

*Primary Examiner* — Daniel G Dobson
(74) *Attorney, Agent, or Firm* — Bret E. Field; Bozicevic, Field & Francis LLP

(57) ABSTRACT

The present application discloses a data secrecy method for a submarine cable system with a failure and a submarine cable system. The method includes: determining a first disaster tolerance set in response to that a failure occurs to a first branch; and replacing a target optical signal in a first optical signal with a virtual optical signal. The first branch is any branch in the submarine cable system. The first disaster tolerance set includes at least one wavelength used for optical signals for transfer from a first terminal station to the first branch. The first optical signal is an optical signal output from the first terminal station. The target optical signal includes optical signals corresponding to the respective wavelengths in the first disaster tolerance set. The virtual optical signal is an optical signal that does not carry data content.

14 Claims, 9 Drawing Sheets

(56) References Cited

FOREIGN PATENT DOCUMENTS

| | | | |
|---|---|---|---|
| CN | 106033994 | A | 10/2016 |
| CN | 106134110 | A | 11/2016 |
| CN | 209897066 | U | 1/2020 |
| CN | 111416658 | A | 7/2020 |
| CN | 111903074 | A | 11/2020 |
| CN | 113644968 | A | 11/2021 |
| CN | 114825246 | A | 7/2022 |
| CN | 116170070 | A | 5/2023 |
| JP | 2002141867 | A | 5/2002 |
| JP | 2003032156 | A | 1/2003 |

\* cited by examiner

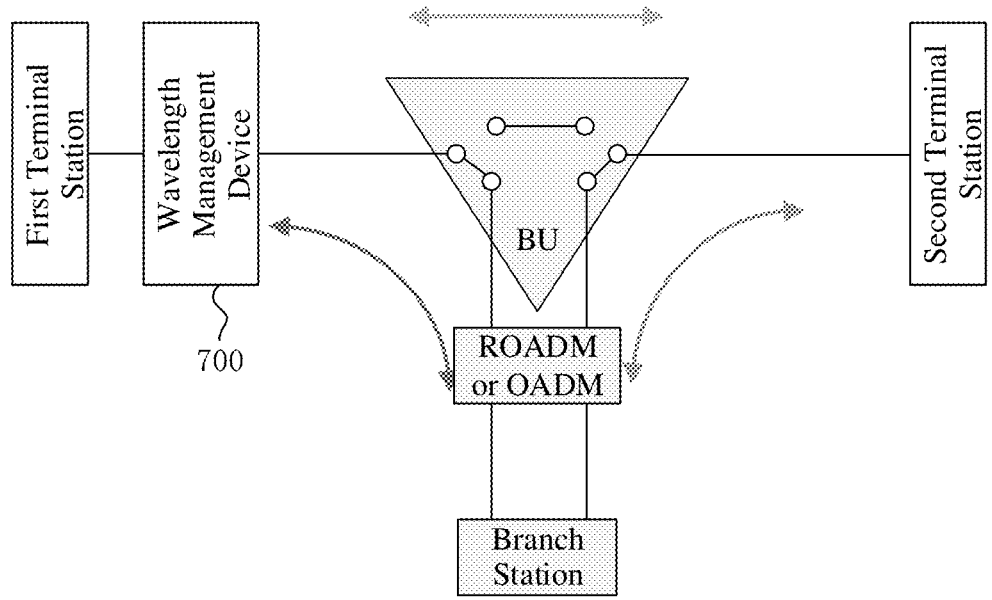

FIG.3

S410
Determine a first disaster tolerance set in response to that a failure occurs to a first branch, where the first branch is any branch submarine cable in a submarine cable system, the first disaster tolerance set includes at least one wavelength used for optical signals for transfer from a fist terminal station to a first branch station, and the first branch station is a branch station on the first branch S420
Replace a target optical signal in a first optical signal with a virtual optical signal, where the first optical signal is an optical signal output from the first terminal station, the target optical signal includes optical signals corresponding to the respective wavelengths in the first disaster tolerance set, the virtual optical signal is an optical signal that does not carry data content, and the virtual optical signal has a wavelength same as that of the target optical signal

FIG.4

DATA SECRECY METHOD FOR SUBMARINE CABLE SYSTEM WITH FAILURE AND SUBMARINE CABLE SYSTEM

CROSS-REFERENCE TO RELATED APPLICATIONS

This application claims the benefit of Chinese Patent Application No. 202310860532.1, filed on Jul. 14, 2023, the entire disclosure of which is expressly incorporated by reference herein.

FIELD OF THE INVENTION

The present application relates to data secrecy technologies, and in particular, to a data secrecy method for a submarine cable system with a failure and a submarine cable system.

BACKGROUND OF THE INVENTION

Undersea fiber communication systems are important communication systems that connect different countries and offshore devices through submarine optical cables, also referred to as submarine cable systems, and span distances of several thousand to tens of thousands of kilometers. A BU (Branching Unit, representing submarine branching unit) is a submarine device in the submarine cable system, where a main function is to connect and configure internal optical fibers to implement fiber interconnection between three ports in the BU. The BU is a key device constituting a complex submarine cable system, and service transmission among a plurality of stations in the submarine cable system may be implemented by the BU.

As shown in FIG. 1, the BU adds and drops a bandwidth portion of a trunk between stations A and B to a branch to connect a station C, so that communication among the stations A, B, and C is implemented. When a failure occurs on a trunk (such as a side where the station A is located), stations (the stations B and C) on a side without the failure are constructed into a fiber pair mode through a bandwidth scheduling function of the BU. Thus, losses of signal power on the faulty side are compensated and degradation in transmission performance caused by power competition is avoided, thereby ensuring that the stations (stations B, C) on the side without the failure may still communicate with each other normally during the failure and maintenance of a submarine cable. Similarly, when a failure occurs on the branch (a side where the station C is located), stations (the stations A and B) on a side without the failure are constructed into a fiber pair mode through an optical path switching function of the BU, thereby ensuring normal communication of the station without the failure.

During a process in which a failure occurs to the submarine cable system and disaster tolerance is implemented by the BU, there is a problem that a service of a faulty station is to be transferred to other stations. Therefore, a PRBS (Pseudo Random Bit Sequence) function is applied between the stations for data secrecy. The PRBS function is to scramble information in data light, so that the content cannot be recognized by a receiving device, thereby achieving data secrecy. Moreover, to implement the PRBS function, it is needed to use a submarine device and a transmission device that are from a same manufacturer, so that the PRBS function of the transmission device may be triggered through submarine disaster tolerance operations.

However, with popularization of open submarine cable system platforms, constructing a submarine cable system by devices from different manufacturers has become conventional. Because the PRBS function cannot be implemented between devices from different manufacturers, the submarine device cannot scramble data from the faulty station after disaster tolerance. As a result, risks of data leakage are increased.

SUMMARY OF THE INVENTION

This application provides a data secrecy method for a submarine cable system with a failure and a submarine cable system, to resolve a problem that risks of data leakage are increased upon disaster tolerance for a submarine device in an open submarine cable system.

According to a first aspect of an embodiment of the present invention, a data secrecy method after a submarine cable system failure is provided, applicable to a submarine cable system. The submarine cable system includes a first terminal station, a second terminal station, a trunk submarine cable connected between the first terminal station and the second terminal station, and at least one branching unit disposed on the trunk submarine cable, where each of the least one branching unit is connected to one branch, and each branch includes a branch submarine cable connected to the branching unit and a branch station connected to the branch submarine cable.

The method includes: determining a first disaster tolerance set in response to that a failure occurs to a first branch, where the first branch is any branch in the submarine cable system, the first disaster tolerance set includes at least one wavelength used for optical signals for transfer from the first terminal station to a first branch station, and the first branch station is a branch station on the first branch; and replacing a target optical signal in a first optical signal with a virtual optical signal, where the first optical signal is an optical signal output from the first terminal station, the target optical signal includes optical signals corresponding to the respective wavelengths in the first disaster tolerance set, the virtual optical signal is an optical signal that does not carry data content, and the virtual optical signal has a wavelength same as that of the target optical signal.

According to the method provided in this embodiment of the present application, after a failure occurs to the submarine cable system, the first disaster tolerance set is determined based on information on the optical signal for transmission and reception by the branch station in the faulty first branch during normal operation. Subsequently, in the first optical signal transmitted from the first terminal station, the target optical signal corresponding to the first disaster tolerance set is replaced with the virtual optical signal that does not carry the data content. When a failure occurs to the branch of the submarine cable system, the optical signal for the faulty branch is replaced, thereby reducing risks of data leakage.

In a feasible implementation, the replacing a target optical signal in a first optical signal with a virtual optical signal includes: filtering out the target optical signal from the first optical signal to obtain a first filtered optical signal; generating the virtual optical signal; and combining and outputting the first filtered optical signal with the virtual optical signal. In this way, when replacing the target optical signal, the target optical signal in the first optical signal may be filtered out, and meanwhile the generated virtual optical signal may be combined with the first filtered optical signal obtained through filtering for output, so as to replace the target optical signal.

In a feasible implementation, after the generating the virtual optical signal, the method further includes: determining power of the target optical signal and power of the virtual optical signal; and if the power of the virtual optical signal is different from that of the target optical signal, adjusting the power of the virtual optical signal, so that the power of the virtual optical signal is same as that of the target optical signal. Because filtering out only the target optical signal may reduce power of the optical signal transferred in the submarine cable system, and decrease in the power may reduce transmission quality of the submarine cable system, impact after the target optical signal is filtered out may be reduced by adjusting the power of the virtual optical signal to be consistent with that of the target optical signal.

In a feasible implementation, the replacing a target optical signal in a first optical signal with a virtual optical signal further includes: determining a first branching unit in response to that a failure occurs to the first branch, where the first branching unit is a branching unit connected to the first branch; and controlling the first branching unit to perform optical path switching to transfer the optical signals corresponding to the respective wavelengths in the first disaster tolerance set to the second terminal station. In this way, after it is detected that a failure occurs to the first branch, controlling the first branching unit corresponding to the first branch to perform optical path switching may interrupt information transmission between the first branch and the trunk submarine cable, thereby maintaining transmission stability of the submarine cable system.

In a feasible implementation, after the controlling the first branching unit to perform optical path switching to transfer the optical signals corresponding to the respective wavelengths in the first disaster tolerance set to the second terminal station, the method further includes: in response to failure elimination on the first branch, stopping filtering out the target optical signal from the first optical signal, and stopping generating the virtual optical signal; and controlling the first branching unit to perform optical path switching to transfer the target optical signal to the first branch station. In this way, after the failure in the first branch is eliminated, to not affect operation of the submarine cable system, the first branch may also be connected to the trunk submarine cable. In other words, an optical path of the first branching unit may be switched back to a state in which the submarine cable system operates normally, so that the first branch may receive the optical signal transmitted from the first terminal station.

In a feasible implementation, before the determining a first disaster tolerance set in response to that a failure occurs to a first branch, the method further includes: determining wavelengths used for optical signals for transfer from the first terminal station to each branch station; and determining a disaster tolerance set corresponding to each branching unit according to the wavelengths used for the optical signals for transfer from the first terminal station to each branch station, where the disaster tolerance set corresponding to each branching unit includes at least one wavelength used for the optical signals for transfer from the first terminal station to the branch station connected to the branching unit. Before the first disaster tolerance set is determined, the wavelength of the optical signal for reception by the branch station is used to determine the disaster tolerance set corresponding to each branch station. In this way, when a failure occurs to a certain branch station, the first disaster tolerance set is quickly determined through a correspondence between the branch station and the disaster tolerance set.

In a feasible implementation, the failure occurring to the first branch includes at least one of a failure occurring to the branch submarine cable on the first branch, a failure occurring to the first branch station, and a failure occurring to the first branching unit. The branch in the submarine cable system includes the branch submarine cable and the branch station, and the branch is connected to a trunk by the branching unit. Therefore, factors that affect transmission and reception of data of the branch include failures on the branch submarine cable, failures on the branch station, and failures on the branching unit. Therefore, when determining a failure on the branch, the branch submarine cable, the branch station, and the branching unit may be detected. If at least one of the three has a failure, the branch has a failure.

According to a second aspect of an embodiment of the present invention, a submarine cable system is provided, including a first terminal station, a second terminal station, a trunk submarine cable connected between the first terminal station and the second terminal station, and at least one branching unit disposed on the trunk submarine cable, where each of the least one branching unit is connected to one branch, and each branch includes a branch submarine cable connected to the branching unit and a branch station connected to the branch submarine cable.

The system further includes: a wavelength management device, disposed on an outgoing-light side of the first terminal station. The wavelength management device is configured to: determine a first disaster tolerance set in response to that a failure occurs to a first branch, where the first branch is any branch in the submarine cable system, the first disaster tolerance set includes at least one wavelength used for optical signals for transfer from the first terminal station to a first branch station, and the first branch station is a branch station on the first branch; and replace a target optical signal in a first optical signal with a virtual optical signal, where the first optical signal is an optical signal output from the first terminal station, the target optical signal includes optical signals corresponding to the respective wavelengths in the first disaster tolerance set, the virtual optical signal is an optical signal that does not carry data content, and the virtual optical signal has a wavelength same as that of the target optical signal. In response to that a failure occurs to the first branch in the submarine cable system, the wavelength management device replaces the optical signal corresponding to the branch station on the first branch with the virtual optical signal that does not carry data, thereby reducing problems of data leakage when performing disaster tolerance due to a failure on the branch in the submarine cable system.

In a feasible implementation, the wavelength management device includes a filtering and combining module, configured to filter out the target optical signal from the first optical signal to obtain a first filtered optical signal; and combine and output the first filtered optical signal with the virtual optical signal. The wavelength management device is provided with an optical signal generation module and the filtering and combining module, to perform an operation on the first optical signal transmitted from the first terminal station and replace the target optical signal in the first optical signal.

In a feasible implementation, the wavelength management device further includes a power detection module, configured to determine power of the target optical signal and power of the virtual optical signal. The filtering and combining module is further configured to: if the power of the virtual optical signal is different from that of the target optical signal, adjust the power of the virtual optical signal, so that the power of the virtual optical signal is same as that of the target optical signal. The wavelength management device is also provided with a power detection module, to enable the filtering and combining module to adjust the power of the virtual optical signal more accurately, thereby reducing errors during filtering and combining, and reducing impact of replacing of the target optical signal on quality of subsequent transmission.

In a feasible implementation, the wavelength management device is further configured to: determine a first branching unit in response to that a failure occurs to the first branch, where the first branching unit is a branching unit connected to the first branch; and control the first branching unit to perform optical path switching to transfer the optical signals corresponding to the respective wavelengths in the first disaster tolerance set to the second terminal station. After it is detected that a failure occurs to the first branch, the wavelength management device may control the branching unit connected to the first branch to perform optical path switching, thereby isolating upper and lower wave signals of the faulty first branch, and reducing impact of the faulty first branch on the submarine cable system.

In a feasible implementation, the wavelength management device is further configured to: in response to failure elimination on the first branch, stop filtering out the target optical signal from the first optical signal, and stop generating the virtual optical signal; and control the first branching unit to perform optical path switching to transfer the target optical signal to the first branch station. After the failure in the first branch is eliminated, in order to recover normal operation of the submarine cable system, the wavelength management device further controls the first branching unit to switch the optical path back to a normal operation state, so that the submarine cable system enters a normal operation state after the failure is recovered.

In a feasible implementation, the wavelength management device is further configured to: determine wavelengths used for optical signals for transfer from the first terminal station to each branch station; and determine a disaster tolerance set corresponding to each branching unit according to the wavelengths used for the optical signals for transfer from the first terminal station to each branch station, where the disaster tolerance set corresponding to each branching unit includes at least one wavelength used for the optical signals for transfer from the first terminal station to the branch station connected to the branching unit. The wavelength management device may determine the disaster tolerance set for each branch through a correspondence between each branch station and a wavelength of the received optical signal when a failure has not occurred, thereby quickly determining the first disaster tolerance set after a failure occurs to a certain branch.

In a feasible implementation, the wavelength management device further includes a failure detection module, configured to detect working states of a branch cable of the first branch, the first branch station, and the first branching unit. The wavelength management device may detect working states of the branch and the corresponding branching unit by providing the failure detection module, so that a faulty branch may be detected timely.

It may be learned from the foregoing technical solutions that the present application provides a data secrecy method for a submarine cable system with a failure and a submarine cable system. The method includes: determining the first disaster tolerance set in response to that a failure occurs to the first branch; and replacing the target optical signal in the first optical signal with the virtual optical signal. The first branch is any branch in the submarine cable system. The first disaster tolerance set includes at least one wavelength used for the optical signals for transfer from the first terminal station to the first branch station. The first branch station is the branch station on the first branch. The first optical signal is the optical signal output from the first terminal station. The target optical signal includes the optical signals corresponding to the respective wavelengths in the first disaster tolerance set. The virtual optical signal is the optical signal that does not carry data content, and the wavelength of the virtual optical signal is same as that of the target optical signal. According to the method, when performing disaster tolerance due to a failure occurring to the branch in the submarine cable system, by means of determining the wavelength of the optical signal transferred to the first branch and replacing the optical signal with the virtual optical signal that does not carry data information, the submarine cable system may not transfer the optical signal of the first branch to other stations upon the disaster tolerance. In this case, the transmission stability of the submarine cable system upon the disaster tolerance is improved, and the risks of data leakage are reduced.

BRIEF DESCRIPTION OF THE DRAWINGS

To describe the technical solutions of the present application to be more clear, the accompanying drawings for the embodiments are briefly described below. Obviously, persons of ordinary skills in the art may also derive other accompanying drawings according to these accompanying drawings without an effective effort.

FIG. 3 is a schematic diagram of a structure of a submarine cable system according to an embodiment of the present application;

FIG. 4 is a flowchart of a data secrecy method for a submarine cable system with a failure according to an embodiment of the present application;

DETAILED DESCRIPTION OF THE EMBODIMENTS

Embodiments are described below in detail, and examples thereof are shown in the accompanying drawings. When the descriptions below relate to the accompanying drawings, unless otherwise stated, same reference signs in various accompanying drawings indicate same or similar elements. Implementations described in the following embodiments do not represent all implementations in accordance with the present application, which are just examples of a device and a method in accordance with those which are described in detail in the claims and some aspects of the present application.

In the embodiments of the present application, a submarine cable system, that is, an undersea fiber communication system, refers to a communication network system including a plurality of submarine communication cables. The communication cables in the system are laid on the seabed, and therefore may be referred to as submarine cable lines. The submarine cable lines may transfer optical signals between terminal stations, implementing a function of cross to sea communication. The submarine cable system may implement long to distance communication, for example, may achieve data communication across tens of thousands of kilometers in the ocean. It should be noted that the submarine cable system in the embodiments of the present application may also be applied to a communication area with a relatively close distance, such as across a river or across a lake.

During a process of constructing the submarine cable system, there may be some stations between terminal stations. However, when a service transmission capacity in the submarine cable system is small and secrecy is required for service transmission, a trunk submarine cable between the terminal stations cannot take a detour to a branch station. Therefore, a branching unit, that is, a BU, is provided on the trunk submarine cable to connect a branch submarine cable and the branch station to the trunk submarine cable.

Figure 1:
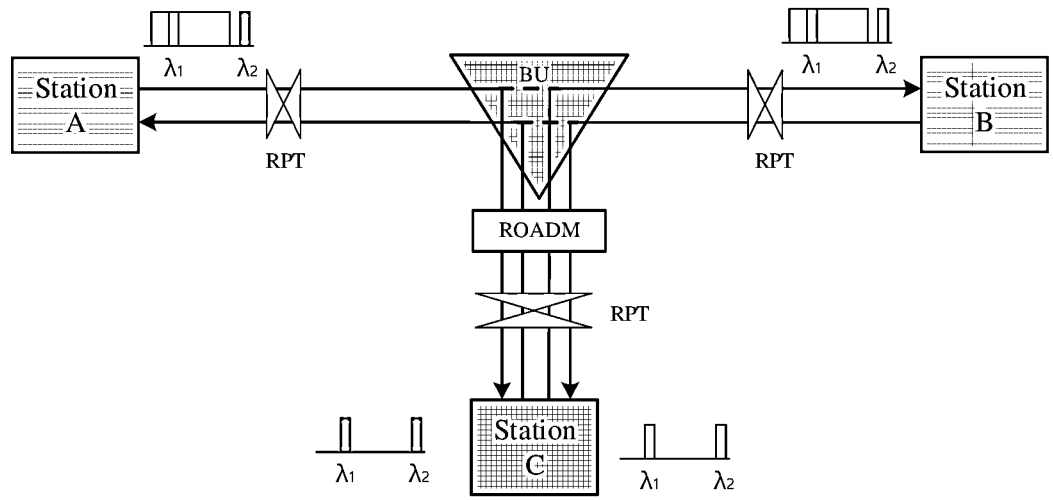
FIG. 1 is a schematic diagram of a structure of a submarine cable system.

As shown in FIG. 1, stations A and B are terminal stations, and station C is a branch station. The three stations are connected through three ports of the BU. The BU has adding and dropping functions, where the dropping function refers to transmitting a part of optical signals transmitted from the station A to the station C, and the adding function refers to combining an optical signal transmitted from the station C into the optical signal transmitted from the station A and outputting the same to the station B. It may be learned from FIG. 1 that, in the submarine cable system, each BU disposed on the trunk submarine cable has a branch submarine cable directly connected to the BU. Therefore, the BU corresponding to each branch station may be determined based on the branch submarine cable connected to the branch station.

In practical application, it is taken as an example that the station A transmits optical signals. The station A transmits optical signals within a bandwidth range of the trunk submarine cable. For example, wavelengths of the optical signals transmitted from the station A are $\|_1 \sim \lambda_n$, where the optical signals with wavelengths of $\lambda_1$ and $\lambda_2$ are transmitted to the station C, and the optical signals with wavelengths of $\lambda_3 \sim \lambda_n$ are transmitted to the station B. When the optical signals transmitted from the station A pass through the BU, the optical signals with the wavelengths of $\lambda_1$ and $\lambda_2$ that correspond to the station C may be divided from the trunk submarine cable and are transferred to the station C through a reconfigurable optical add-drop multiplexer (ROADM). Meanwhile, optical signals with the wavelengths of $\lambda_1$ and $\lambda_2$ may be transmitted from the station C, and are combined into the optical signals with the wavelengths of $\lambda_3 \sim \lambda_n$ through the BU, and then the combined optical signals are transferred to the station B through the trunk submarine cable. Wavelengths of the optical signals received by the station C are the same as those of the optical signals transmitted from the station C. However, the optical signals transmitted from the station C are modulated to contain different data contents from the optical signals received by the station C, so that the optical signals transferred to the station C may not be transferred to the station B, thereby achieving data secrecy.

However, if a failure occurs during the transmission process, for example, a failure occurs to the station C or a submarine cable connected to the station C, the station C cannot receive or transmit data, and the optical signals with the wavelengths of $\lambda_1$ and $\lambda_2$ cannot be dropped to the station C. In this case, the optical signals transmitted from the station A may be transferred to the station B directly through the trunk submarine cable, so that the optical signals with the wavelengths of $\lambda_1$ and $\lambda_2$ that should be transferred to the station C may be transferred to the station B, resulting in risks of data leakage.

Figure 2:
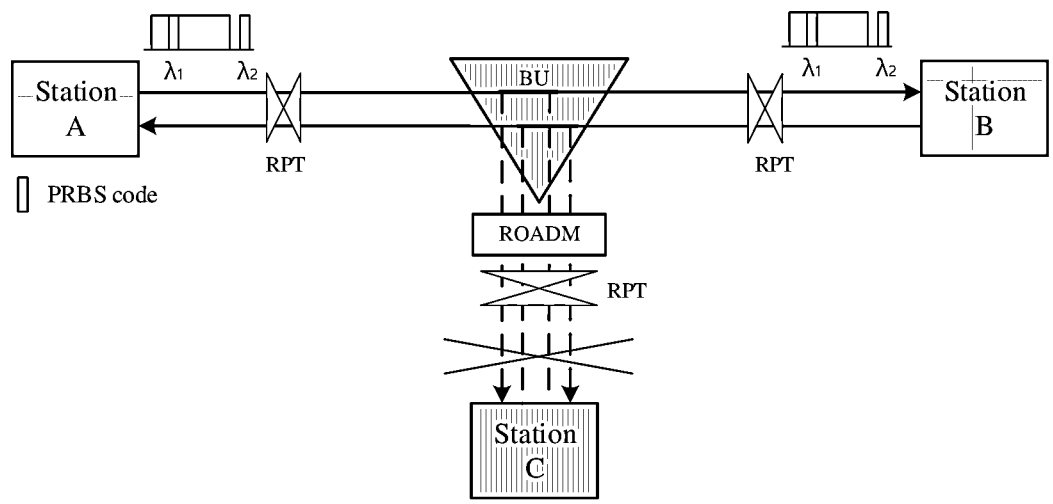
FIG. 2 is a schematic diagram of a structure of a submarine cable system with a failure.

In some embodiments, when a transmission failure occurs in the submarine cable system, data that needs to be kept in secrecy between terminal stations may be encrypted through a PRBS function. For example, as shown in FIG. 2, if a failure occurs to the station C or the submarine cable connected to the station C, service code in the optical signals with the wavelengths of $\lambda_1$ and $\lambda_2$ is replaced with pseudo random code through a terminal station device in the station A responding to failure information from the BU, so that optical signals transmitted to the station B does not include service data corresponding to the optical signals with the wavelengths of $\lambda_1$ and $\lambda_2$, resulting in that the station B cannot obtain service data for being transferred to the station C. However, during application of the PRBS function, it is needed to apply a terminal station device and a submarine device that are from a same manufacturer, so that the submarine device may quickly trigger a scrambling function of the terminal station device after disaster tolerance, thereby implementing data secrecy.

However, with the rise of the concept of Open Cable, that is, the open submarine cable networks, the submarine device and the terminal station device are decoupled, so that the submarine device and the terminal station device may be supplied by different manufacturers, and thus a transmission device may be updated and upgraded in disregard of the submarine device, reducing comprehensive costs of the submarine cable system and improving flexibility of a system architecture. In solutions for the Open Cable, because the submarine device and a marine device may come from different manufacturers, operations and relevant alarms of the submarine device may not be transferred to the terminal station device. As a result, the PRBS function cannot be triggered, and the submarine cable system has risks of data leakage when implementing disaster tolerance of the device.

An embodiment of the present application provides a data secrecy method for a submarine cable system with a failure, to resolve a problem that a submarine cable system has risks of data leakage during disaster tolerance of a device. In some embodiments of the present application, the data secrecy method is applied to a submarine cable system, so that transferred data may be processed when a failure occurs to a branch in the submarine cable system, thereby reducing risks of data leakage of the submarine cable system.

For example, the submarine cable system includes a first terminal station, a second terminal station, a trunk submarine cable connected between the first terminal station and the second terminal station, and at least one branching unit disposed on the trunk submarine cable. Each of the least one branching unit is connected to one branch, and each branch includes a branch submarine cable connected to the branching unit and a branch station connected to the branch submarine cable. In some embodiments, before being transmitted to the trunk submarine cable from the first terminal station, optical signals need to be modulated by a modulation device in the first terminal station, so that the optical signals with different wavelengths may carry data, thereby meeting data requirements of different stations. To ensure that the signal modulation process does not affect the wavelength of the optical signal, the terminal station adopts coherent modulation during the optical signal modulation process to enable the optical signal to carry data.

It is taken as an example that the first terminal station in the submarine cable system serves as a signal transmitter terminal. As shown in FIG. 3, a wavelength management device 700 is further disposed between the first terminal station and a branching unit closest to the first terminal station along a trunk. The wavelength management device 700 may perform processing after a failure occurs in the submarine cable system, and a signal processed by the wavelength management device 700 is an optical signal output from the first terminal station.

In the embodiments of the present application, the data secrecy method may be applied to the submarine cable system described above. As shown in FIG. 4, the data secrecy method includes the following steps.

S410. Determine a first disaster tolerance set in response to that a failure occurs to a first branch.

The first branch is any branch submarine cable in the submarine cable system. The first disaster tolerance set includes at least one wavelength used for optical signals for transfer from the first terminal station to a first branch station. The first branch station is a branch station on the first branch.

Figure 5:
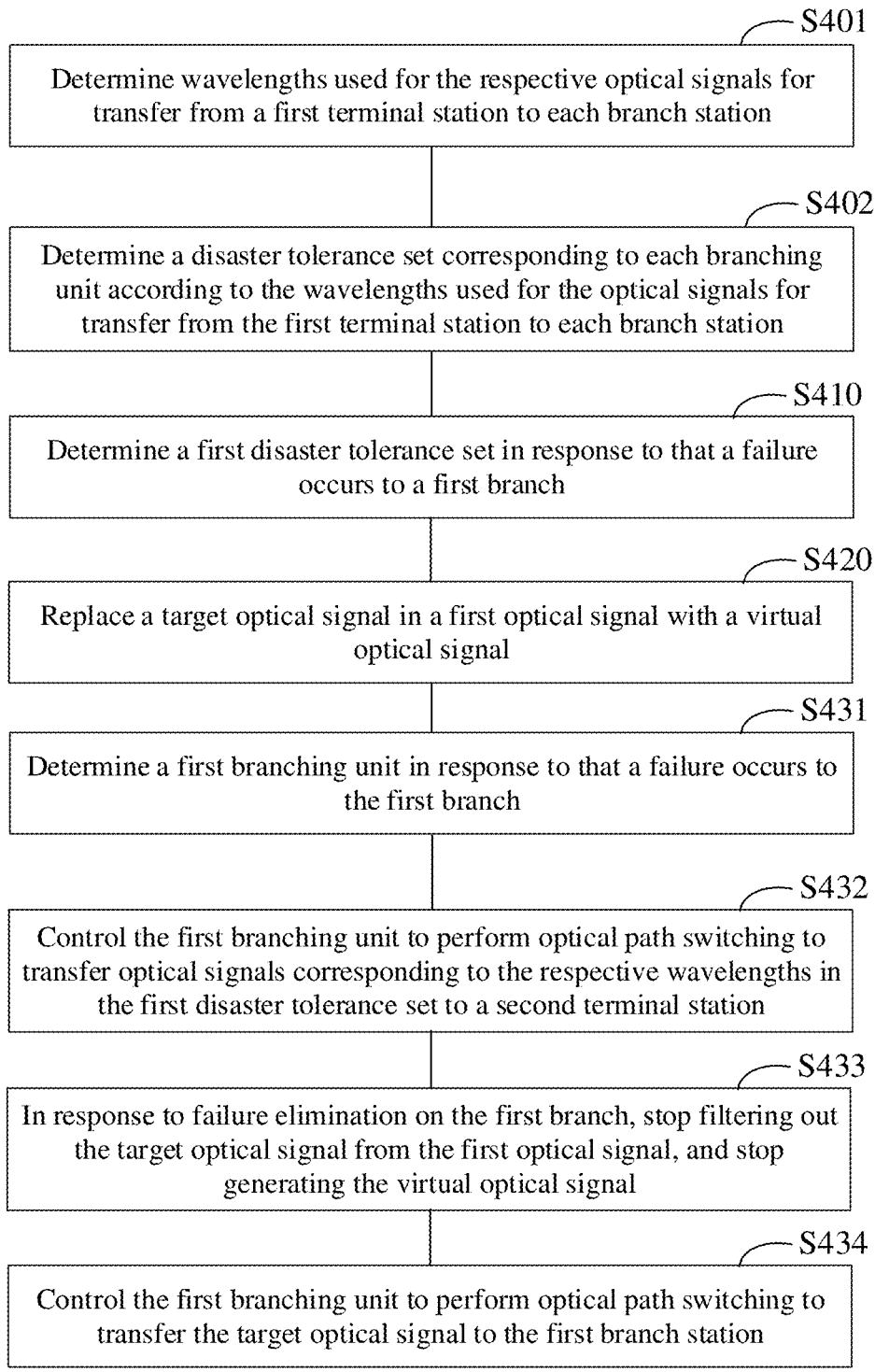
FIG. 5 is a flowchart of a data secrecy method for a submarine cable system with a failure according to another embodiment of the present application.

In some embodiments, the wavelength management device 700 may determine a disaster tolerance set corresponding to each branch station as well as each branching unit when failure has not occurred in the submarine cable system, so that the first disaster tolerance set is determined timely when a failure occurs to the first branch. For example, before the first disaster tolerance set is determined, as shown in FIG. 5, the data secrecy method further includes the following steps.

S401. Determine wavelengths used for the respective optical signals for transfer from a first terminal station to each branch station.

There are various manners for acquiring the wavelength of the optical signal for reception by each branch station. For example, by acquiring a correspondence between the wavelength of the optical signal and the branch station through configuration information in a transmission device of the first terminal station and each branch station, the optical signals transmitted from the first terminal may be classified according to wavelengths, so that the optical signals for transfer to different branch stations are divided therefrom. For another example, during normal operation of the submarine cable system, the wavelength management device 700 detects wavelengths of the optical signals received by and transmitted from each branch station, thereby acquiring the wavelengths used for the optical signals for transfer from each branch station.

It should be understood that each branch station is allocated with an optical signals with at least one wavelength, so that each branch station may receive data transmitted from the first terminal station.

S402. Determine a disaster tolerance set corresponding to each branching unit according to the wavelengths used for the optical signals for transfer from the first terminal station to each branch station.

The disaster tolerance set corresponding to each branching unit includes at least one wavelength used for the optical signals for transfer from the first terminal station to the branch station connected to the branching unit. After wavelengths used for the optical signals for transfer from each branch station are determined, the wavelengths of the optical signals corresponding to each branching unit may be determined based on a correspondence between the branch station and the branching unit, thereby acquiring the disaster tolerance set corresponding to each branching unit.

It should be understood that content in the disaster tolerance set corresponding to each branching unit may be partially the same or may be completely different. The wavelength of the optical signal specifically included in each disaster tolerance set is not limited in the present application.

Upon the disaster tolerance set corresponding to each branching unit is determined, when disaster tolerance is performed due to the failure in the first branch, the branching unit corresponding to the first branch may be first determined based on a connection relationship between a branch submarine cable and a trunk submarine cable in the first branch, and then the disaster tolerance set corresponding to the branching unit is determined as the first disaster tolerance set.

During operation of the submarine cable system, the wavelength management device 700 may monitor a data transmission situation in the submarine cable system to obtain information about a failure that may possibly occur in the submarine cable system. Specifically, the wavelength management device 700 may monitor the branch submarine cable of the first branch, the first branch station corresponding to the first branch, and the first branching unit corresponding to the first branch, respectively. The first branching unit is a branching unit connected to the first branch. When it is detected by the wavelength management device 700 that a failure occurs to any one of the foregoing devices, it is determined that a failure occurs to the first branch. To be specific, the failure occurring to the first branch includes at least one of the following situations: a failure occurring to the branch submarine cable on the first branch, a failure occurring to the first branch station, and a failure occurring to the first branching unit. For example, the failure occurring to the branch submarine cable on the first branch includes interruption of the branch submarine cable, increased losses of the branch submarine cable, and the like. The failure occurring to the first branch station includes a device failure in the first branch station, inability of the first branch station to transmit and receive optical signals, and the like. The failure occurring to the first branching unit includes inability of the first branching unit to add and/or drop optical signals. The foregoing failure situations are only examples in the present application, and types of failures that occur in the first branch are not limited in the present application.

When any device in the branch submarine cable, the first branch station, and the first branching unit that correspond to the first branch encounters an abnormality, a communication connection relationship between the first branch station and the trunk submarine cable may be affected. As a result, the first branching unit cannot implement adding and dropping functions for the optical signal. For example, when the branch submarine cable of the first branch is interrupted, there may also be situations in the first branch where the optical signal cannot be dropped to the first branch station from the first branching unit, and the optical signal cannot be added to the first branching unit from the first branch station. When the first branch station is abnormal in transmitting and receiving signals, there may also be situations in the first branch where the optical signal cannot be received by the first branching unit from the first branch station for adding. Therefore, in some other embodiments of the present application, the monitoring for the first branch may be simplified as monitoring adding and dropping situations of the first branching unit by a monitoring device disposed in the first branching unit, to determine transmission performance of the first branch.

After it is detected by the wavelength management device 700 that a failure occurs to the first branch, the first disaster tolerance set may be determined according to wavelength information about a signal transferred between the first terminal station and the first branch station.

It should be understood that a number of wavelengths included in the first disaster tolerance set is related to wavelengths of optical signals that may be received by the first branch station. For example, when the first branch station may receive optical signals with wavelengths of $\lambda_1$ and $\lambda_2$, information of the wavelengths included in the first disaster tolerance set includes $\lambda_1$ and $\lambda_2$. $\lambda_1$ and $\lambda_2$ both represent a range of wavelengths, such as 1560 to 1561 nm, rather than an exact wavelength value. Information of the wavelengths specifically included in the first disaster tolerance set is not limited in the present application.

It should be noted that content included in the first disaster tolerance set represents a feature of the optical signal for transfer from the first terminal station to the first branch station, for distinguishing the optical signal from other optical signals transferred in a submarine cable, which is represented by the wavelength of the optical signal in some embodiments of the present application. Moreover, because a propagation speed of the optical signal is a product of the wavelength of the optical signal and a frequency of the optical signal, the frequency of the optical signal is inversely correlated with the wavelength of the optical signal when the propagation speed of the optical signal remains unchanged. In other words, a higher frequency indicates a shorter wavelength, while a lower frequency indicates a longer wavelength. Therefore, in some embodiments of the present application, the optical signal may also be limited by two parameters in the first disaster tolerance set: a starting frequency and an end frequency of the optical signal.

In some embodiments of the present application, after construction of the submarine cable system is completed, in order to define a channel occupied by each station during transmission, wavelengths may be allocated for optical signals for receiving and transmitting at the terminal station and the branch station. In this case, the wavelength of the optical signal for each branch station is definite during use of the submarine cable system, and disaster tolerance efficiency is improved.

S420. Replace a target optical signal in a first optical signal with a virtual optical signal.

The first optical signal is an optical signal output from the first terminal station. The target optical signal includes optical signals corresponding to the respective wavelengths in the first disaster tolerance set. The virtual optical signal is an optical signal that does not carry data content, and the virtual optical signal has a wavelength same as that of the target optical signal.

In the embodiments of the present application, the target optical signal in the first optical signal may be replaced with the virtual optical signal by the wavelength management device 700. Because the wavelength management device 700 is disposed between the first terminal station and the branching unit closest to the first terminal station, the first optical signal output from the first terminal station may first pass through the wavelength management device 700. When it is detected by the wavelength management device 700 that a failure occurs in the submarine cable system and disaster tolerance is performed, after the first disaster tolerance set is determined, the wavelength management device 700 may process the first optical signal, thereby reducing risks of data leakage.

For example, after the first disaster tolerance set is determined by the wavelength management device 700, the target optical signal corresponding to the first disaster tolerance set may be acquired from the first optical signal. It should be understood that information included in the first disaster tolerance set is wavelength information on the optical signal. Therefore, the target optical signal is an optical signal with a wavelength in accordance with the wavelength information included in the first disaster tolerance set. For example, if the wavelength information in the first disaster tolerance set includes $\lambda_1$ and $\lambda_2$, target optical signal includes the optical signal with the wavelength of $\lambda_1$ and the optical signal with the wavelength of $\lambda_2$. It is taken as an example that first optical signals output from the first terminal station are optical signals with wavelengths of $\lambda_1 \sim \lambda_n$. The first optical signal has a wave number of n. The target optical signal has a wave number the same as a number of wavelength information included in the first disaster tolerance set, and the wave number of the target optical signal is smaller than the wave number n of the first optical signal.

It should be noted that the first optical signal and the target optical signal in the embodiments of the present application are both modulated optical signals carrying data content. To reduce the risks of data leakage when a failure occurs to the first branch, the virtual optical signal is generated by the wavelength management device 700 to replace the target optical signal. To achieve secrecy, the virtual optical signal is an optical signal that is not modulated. The data content carried in the target optical signal may be replaced with an optical signal that does not carry data by replacing the modulated target optical signal with the virtual optical signal, thereby preventing an optical signal carrying secrecy data from being transferred to other stations in the submarine cable system, which results in leakage.

According to the content in the foregoing embodiments, a data secrecy method is provided. After a failure occurs to the submarine cable system, the first disaster tolerance set is determined based on information on the optical signal for transmission and reception by the branch station in the faulty first branch during normal operation. Subsequently, in the first optical signal transmitted from the first terminal station, the target optical signal corresponding to the first disaster tolerance set is replaced with the virtual optical signal that does not carry the data content. When a failure occurs to the branch of the submarine cable system, the optical signal for the faulty branch is replaced, thereby reducing risks of data leakage.

Further, when a failure occurs to the first branch in the submarine cable system, optical signals cannot be received by or transmitted from the first branch station. However, when a failure has not occurred to the branching unit, the branching unit corresponding to the first branch may still drop the optical signal, and transmission performance of a non-faulty end is affected. Therefore, to maintain normal data transmission on the non-faulty end, after the target optical signal in the first optical signal is replaced with the virtual optical signal, as shown in FIG. 5, the data secrecy method further includes the following steps.

S431. Determine a first branching unit in response to that a failure occurs to the first branch.

The first branching unit is a branching unit connected to the first branch. When a failure occurs to the first branch, the wavelength management device 700 determines the first branching unit based on a connection relationship between the branching unit and the first branch. It may be learned, from a structure of the submarine cable system that, each BU disposed on a trunk submarine cable has a branch submarine cable directly connected to the BU. On this basis, a corresponding first branching unit may be determined according to connection information of the first branch.

In some embodiments, the wavelength management device 700 is further configured to detect the failure in the first branch. Because the wavelength management device 700 is disposed between the first branching unit and the first terminal station, when a failure occurs to the first branch, failure information may be directly transmitted to the wavelength management device 700 through the first branching unit, so that the wavelength management device 700 may respond to the failure in the first branch.

S432. Control the first branching unit to perform optical path switching, to transfer optical signals corresponding to the respective wavelengths in the first disaster tolerance set to a second terminal station.

After the first branching unit corresponding to the first branch is determined, the wavelength management device 700 may control the first branching unit to perform optical path switching to interrupt information transmission between the trunk submarine cable and the branch submarine cable, thereby reducing impact of a faulty end on the non-faulty end. For example, the wavelength management device 700 may control the optical path switching of the branching unit by a ROADM disposed in the branching unit. When a transmission failure occurs to the first branch, the branching unit may be adjusted to a fiber pair mode between the first terminal station and the second terminal station for optical path switching. It should be noted that it is only a feasible implementation for optical path switching that the optical path switching is performed by the ROADM disposed in the branching unit. Specific manners for optical path switching are not limited in the present application.

It should be understood that the optical signals transferred to the second terminal station also include other optical signals in the first optical signal except the target optical signal, and the target optical signal has been replaced with the virtual optical signal by the wavelength management device 700. Therefore, in the optical signals transferred to the second terminal station after the optical path switching is performed, the optical signals corresponding to the respective wavelengths in the first disaster tolerance set are all virtual optical signals. In this case, the optical signals transferred to the second terminal station may not contain content in the target optical signal, thereby achieving data secrecy.

After a failure occurs in the submarine cable system, maintenance may be performed for the failure by maintenance personnel. After the failure is eliminated by maintenance, the normal operation of the submarine cable system may be recovered. Therefore, in some embodiments, when the failure in the first branch is eliminated, it indicates that the first branch may transfer the optical signal. In this case, the method also includes the following steps.

S433. In response to failure elimination on the first branch, stop filtering out the target optical signal from the first optical signal, and stop generating the virtual optical signal.

In some embodiments, after a failure occurs to the first branch and disaster tolerance is performed, the wavelength management device 700 may transmit a detection optical signal to the first branch to verify whether the failure in the first branch has been eliminated. The detection optical signal may be an optical signal with any wavelength. For example, after a failure occurs to the first branch, the wavelength management device 700 transmits the detection optical signal to the first branch in a real-time manner to detect a state of the first branch. When the failure in the first branch is eliminated, the detection optical signal may be received by the first branch station. After receiving the detection optical signal, the first branch station generates a corresponding reply optical signal and adds the reply optical signal to the trunk submarine cable. Therefore, if the reply optical signal is acquired by the wavelength management device 700 from the trunk submarine cable, it may be deemed that the failure in the first branch has been eliminated.

In some other embodiments of the present application, after the failure in the first branch is eliminated, the first branch station may transmit an optical signal to the branching unit. After the branching unit receives the optical signal transmitted from the first branch station, a signal may be transmitted to the wavelength management device 700 to indicate that the failure in the first branch has been eliminated and normal data transmission may be performed.

When it is detected that the failure in the first branch has been eliminated, the wavelength management device 700 may stop filtering out the target optical signal from the first optical signal and stop generating the virtual optical signal, thereby helping to recover the normal operation of the submarine cable system.

It should be understood that because wavelengths of the target optical signal and the virtual optical signal are the same, channels occupied in the submarine cable are the same. In this embodiment, filtering of the target optical signals and generation of the virtual optical signal are stopped at the same time, thereby avoiding competition between optical signals with a same wavelength, so that the submarine cable system operates more stably.

S434. Control the first branching unit to perform optical path switching to transfer the target optical signal to the first branch station.

After the failure in the first branch is eliminated, in order to enable the first branch station to receive the target optical signal again, the wavelength management device 700 may control the branching unit to perform optical path switching. For example, the first branching unit is controlled to perform the optical path switching, so that a part of first optical signals transmitted from the first terminal station are transferred to the first branch station.

It should be understood that the optical path switching in the present step and the optical path switching in step S432 are inverse processes to each other. The optical path switching in step S432 is to switch the optical path of the first branching unit from three-end interconnection between the first terminal station, the first branch station, and the second terminal station to two-end interconnection between the first terminal station and the second terminal station. However, the optical path switching in the present step is to switch the optical path of the first branching unit from the two-end interconnection between the first terminal station and the second terminal station to the three-end interconnection between the first terminal station, the first branch station, and the second terminal station.

According to the content in the foregoing embodiments, a data secrecy method is provided. When maintaining data secrecy, optical path switching is performed on the branching unit corresponding to the first branch to ensure normal operation of a non-faulty station in the submarine cable system. After it is detected that a failure occurs to the first branch, the first branching unit corresponding to the first branch is controlled to perform optical path switching, to interrupt the information transmission between the first branch and the trunk submarine cable, thereby maintaining transmission stability of the submarine cable system. Further, after the failure in the first branch is eliminated, in order not to affect the operation of the submarine cable system, the first branch may also be connected to the trunk submarine cable, that is, the optical path of the first branching unit may be switched back to a state in which the submarine cable system operates normally, so that the first branch may receive the optical signal transmitted from the first terminal station.

Figure 6:
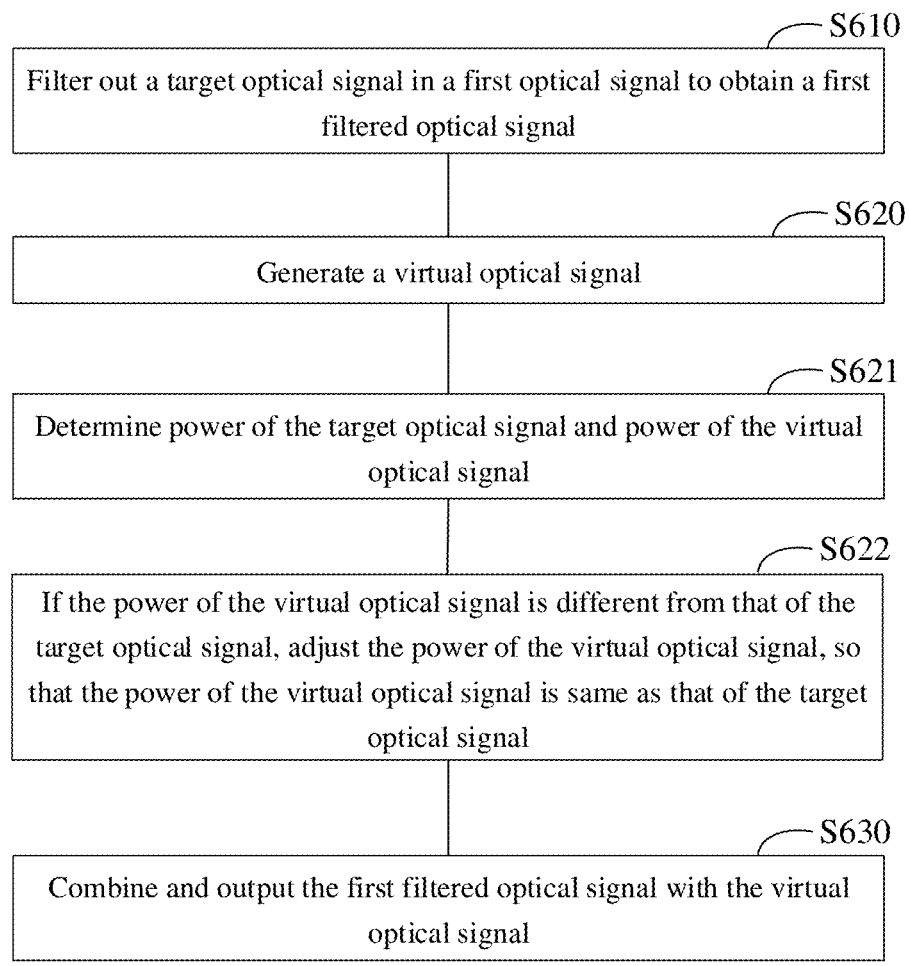
FIG. 6 is a schematic flowchart of generating a virtual optical signal according to an embodiment of the present application.

In some embodiments of the present application, to implement data secrecy while not affecting the transmission stability of the submarine cable system, the virtual optical signal may be processed when the optical signal is replaced. As shown in FIG. 6, replacing target optical signal in the first optical signal with the virtual optical signal may include the following process.

S610. Filter out the target optical signal from the first optical signal to obtain a first filtered optical signal.

First, the wavelength management device 700 needs to filter out the target optical signal from the first optical signal to obtain the first filtered optical signal. Because the target optical signal is an optical signal corresponding to the wavelength information in the first disaster tolerance set, the first filtered optical signal does not include the optical signal corresponding to the wavelength in the first disaster tolerance set. For example, when wavelengths of the first optical signal include $\lambda_1 \sim \lambda_n$ and the wavelengths in the first disaster tolerance set include $\lambda_1$ and $\lambda_2$, the optical signals with wavelengths of $\lambda_1$ and $\lambda_2$ in the first optical signal are filtered out by a filter or in other manners, to obtain the first filtered optical signal with wavelengths of $\lambda_3 \sim \lambda_n$.

It should be noted that during the process in which the first terminal station transmits the first optical signal, the first terminal station may modulate optical signals in various bands. After modulation is completed, the optical signals in different bands are combined, so that the optical signals in different bands are transferred in the trunk submarine cable simultaneously.

Therefore, in some embodiments, before filtering out the target optical signal from the first optical signal, the wavelength management device 700 may adjust a filtering band according to the wavelength information in the first disaster tolerance set, so that the optical signal corresponding to the wavelength in the first disaster tolerance set is filtered out when the first optical signal passes through the wavelength management device 700. In this way, the first filtered optical signal is obtained.

S620. Generate the virtual optical signal.

The virtual optical signal does not need to be modulated, provided that an optical signal with a corresponding wavelength is generated according to the wavelength information in the first disaster tolerance set. The virtual optical signal is used to pad for the filtered target optical signal, to reduce power variation of the optical signal transferred in the trunk submarine cable, thereby reducing impact of replacing of the target optical signal on quality of signal transmission.

In some embodiments, in order to improve the transmission quality of the submarine cable system and lengthen a transmission distance of the submarine cable system, optical amplifiers may be provided in the trunk submarine cable and the branch submarine cable, to gain the signals transferred in the submarine cable system. In the optical amplifier, while a pump light source excites particles to return from a high-energy level to a low-energy level and amplifies the optical signal passing therethrough, the excited particles may also generate random incoherent spontaneous emission, and emit optical signals. Therefore, the wavelength management device 700 may use a same principle as the optical amplifier to generate the virtual optical signal by amplified spontaneous emission, so as to replace the target optical signal.

It should be understood that during a process of amplifying the optical signal in the optical amplifier, amplified spontaneous emission is noise and needs to be eliminated to ensure gain quality of a transmission optical amplifier. Therefore, a spontaneous emission light source for generating the virtual optical signal is not used for an optical amplifier for gaining the optical signal.

For example, the spontaneous emission light source may be disposed in the wavelength management device 700 to generate an optical signal corresponding to the wavelength in the first disaster tolerance set through spontaneous emission. The optical signal generated through spontaneous emission is not modulated and does not carry data content, and therefore may be used as the virtual optical signal to be combined with the first filtered optical signal, to stabilize signal transmission power in the trunk submarine cable.

In some embodiments of the present application, in order to improve the signal transmission power in the trunk submarine cable system upon the disaster tolerance of the submarine cable system, so as to stabilize the transmission quality of the submarine cable system, reduce degradation in transmission performance caused by power competition, and ensure normal operation of a non-faulty device, as shown in FIG. 6, after the virtual optical signal is generated, the data secrecy method further includes the following steps.

S621. Determine power of the target optical signal and power of the virtual optical signal.

When the first optical signal and the virtual optical signal are transmitted to the wavelength management device 700, the wavelength management device 700 detects, by a device that may detect the power of the optical signal in the submarine cable system, the target optical signal in the first optical signal and the virtual optical signal generated by the wavelength management device 700, to obtain power information corresponding to the target optical signal and the virtual optical signal.

In some embodiments, the power of the target optical signal may also be determined in other manners. For example, the wavelength management device 700 may detect power of the first optical signal transmitted from the first terminal station and power of the first filtered optical signal obtained through filtering, so as to determine the power of the target optical signal by a difference between the power of the first optical signal and the power of the first filtered optical signal.

In some other embodiments, the wavelength management device 700 may detect power information of optical signals with various wavelengths in the first optical signal during the normal operation of the submarine cable system; and in steps S401 and S402 described above, write the power information of the optical signals with various wavelengths into the corresponding disaster tolerance set according to the wavelengths, so that the power of the target optical signal is obtained from the first disaster tolerance set after the first disaster tolerance set is determined.

S622. If the power of the virtual optical signal is different from that of the target optical signal, adjust the power of the virtual optical signal, so that the power of the virtual optical signal is same as that of the target optical signal.

After determining the power of the target optical signal and the virtual optical signal, the wavelength management device 700 may further compare the power of the target optical signal and the power of the virtual optical signal. When the power of the virtual optical signal is different from that of the target optical signal, the power of the virtual optical signal may be adjusted. For example, if the power of the virtual optical signal is greater than that of the target optical signal, attenuation may be applied to the virtual optical signal. If the power of the virtual optical signal is smaller than that of the target optical signal, gain may be applied to the virtual optical signal.

It should be understood that attenuation or gain is applied to the virtual optical signal so as to adjust the power of the virtual optical signal to a same level as that of the target optical signal, thereby reducing changes in the power of the optical signal during a process of replacing of the target optical signal. During the process of filtering and combining, due to factors such as insertion losses between a device and a submarine cable, a fluctuation value of the power of the optical signal transferred in the submarine cable system may be greater than that of the power of the target optical signal or the virtual optical signal. On this basis, only the power of the virtual optical signal is adjusted to the power of the target optical signal, and there is a situation in which the power of the optical signal obtained through combining is different from the power of the first optical signal.

In some embodiments of the present application, after the first filtered optical signal is combined with the virtual optical signal, the power of the optical signal obtained through combining may be adjusted to a value of the power of the first optical signal upon detecting of the power of the first optical signal, so that the power in the submarine cable system remains stable, thereby reducing degradation in transmission performance caused by changes in signal power.

S630. Combine and output the first filtered optical signal with the virtual optical signal.

After being generated, the virtual optical signal may be combined with the first filtered optical signal, and then may be output to the trunk submarine cable for transmission, so as to reach an effect that the target optical signal in the first optical signal is replaced.

According to the foregoing implementations, during the process of replacing of the target optical signal, the target optical signal in the first optical signal may be filtered out first, and meanwhile the generated virtual optical signal may be combined with the first filtered optical signal obtained through filtering for output, so as to reach that the target optical signal is replaced. Meanwhile, during the process of replacing of the target optical signal, power control is performed on the virtual optical signal to reduce degradation in transmission performance caused by power changes, and maintain data transmission between non-faulty end devices.

Figure 7:
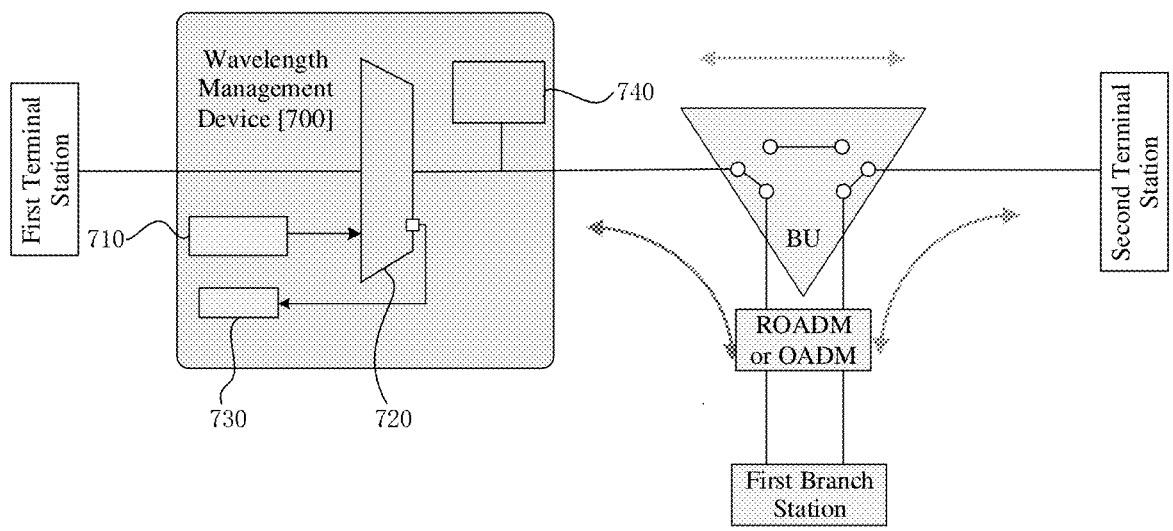
FIG. 7 is a schematic diagram of a structure of a submarine cable system with a wavelength management device according to an embodiment of the present application.
Figure 8:
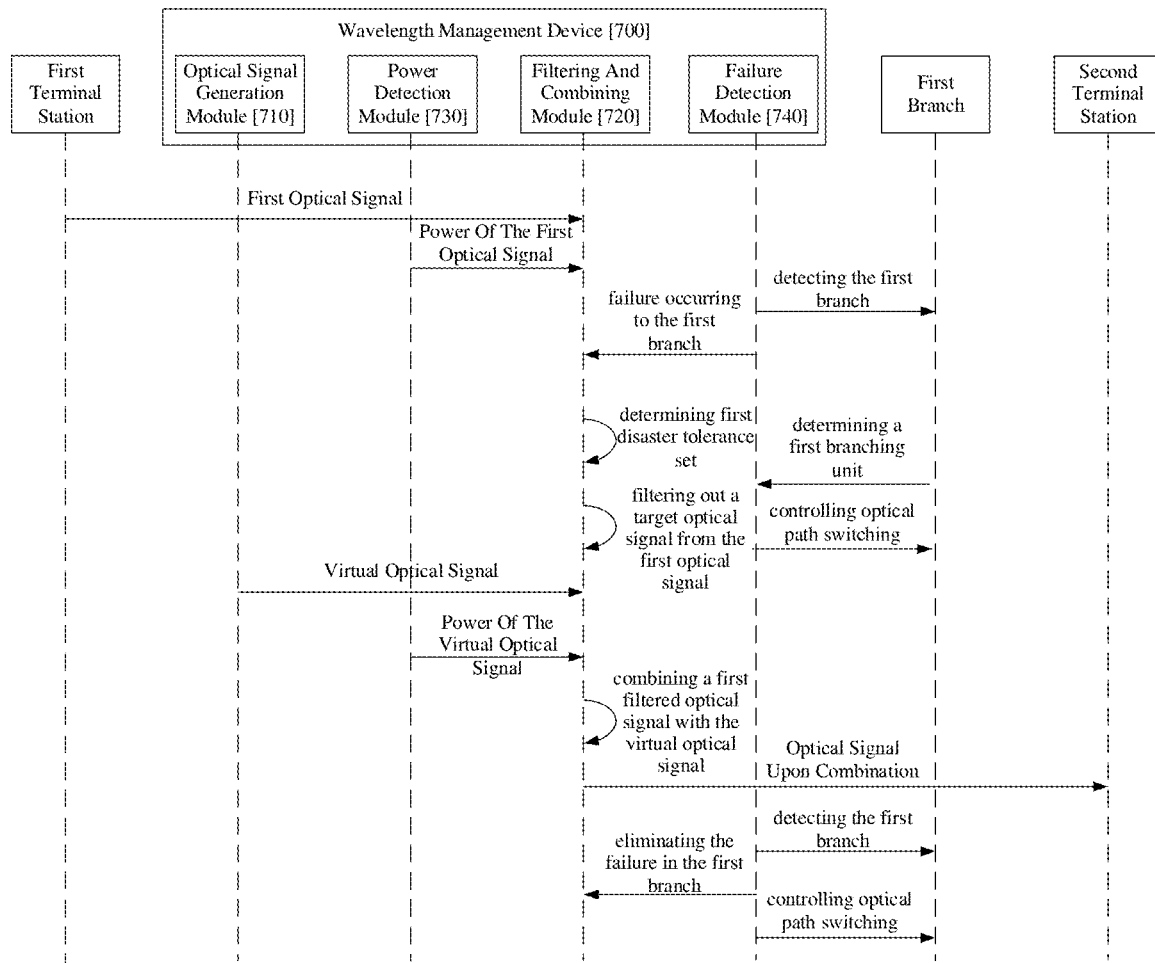
FIG. 8 shows a data secrecy method for a submarine cable system with a failure according to an embodiment of the present application.

According to the data secrecy method for a submarine cable system, the present application further provides a submarine cable system. The submarine cable system includes a first terminal station, a second terminal station, a trunk submarine cable connected between the first terminal station and the second terminal station, and at least one branching unit disposed on the trunk submarine cable. As shown in FIG. 7 and FIG. 8, the submarine cable system further includes a wavelength management device 700 disposed between an outgoing-light side of the first terminal station and a branching unit closest to the first terminal station. The wavelength management device 700 may be configured to implement the data secrecy method provided in the foregoing embodiments.

The wavelength management device 700 is configured to: determine a first disaster tolerance set in response to that a failure occurs to a first branch; and replace a target optical signal in a first optical signal with a virtual optical signal. The first branch is any branch submarine cable in the submarine cable system. The first disaster tolerance set includes at least one wavelength used for optical signals for transfer from the first terminal station to a first branch station. The first branch station is a branch station on the first branch.

The wavelength management device 700 may monitor a transmission situation of each branch in the submarine cable system, to determine whether there is a failure in the submarine cable system. For example, in some embodiments, the wavelength management device 700 includes an optical signal generation module 710 and a filtering and combining module 720, to replace the target optical signal in the first optical signal transmitted from the first terminal station. It should be understood that, in order to output the generated virtual optical signal, the optical signal generation module 710 is connected to the filtering and combining module 720 by an optical fiber or another medium capable of transferring optical signals.

Figure 9:
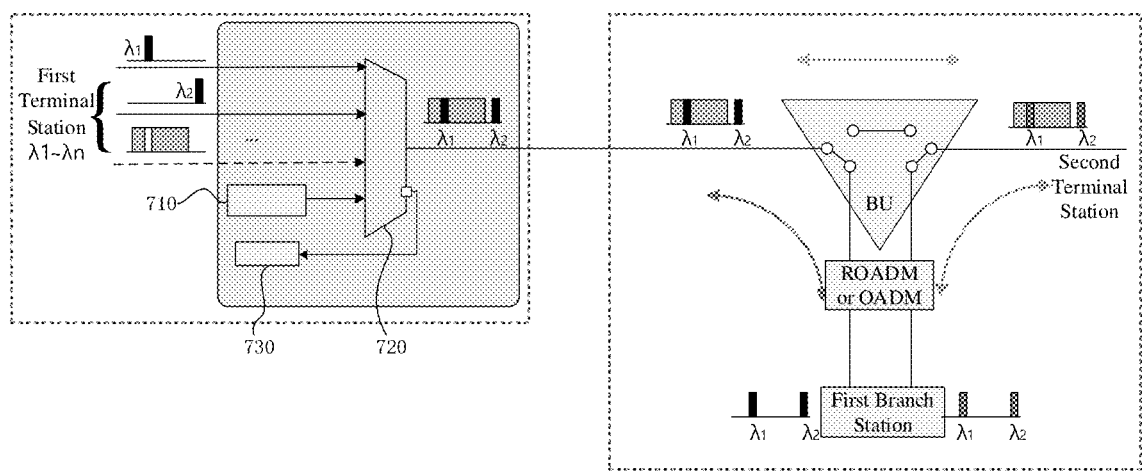
FIG. 9, FIG. 10, and FIG. 11 are diagrams of application scenarios of a data secrecy method according to an embodiment of the present application.
Figure 10:
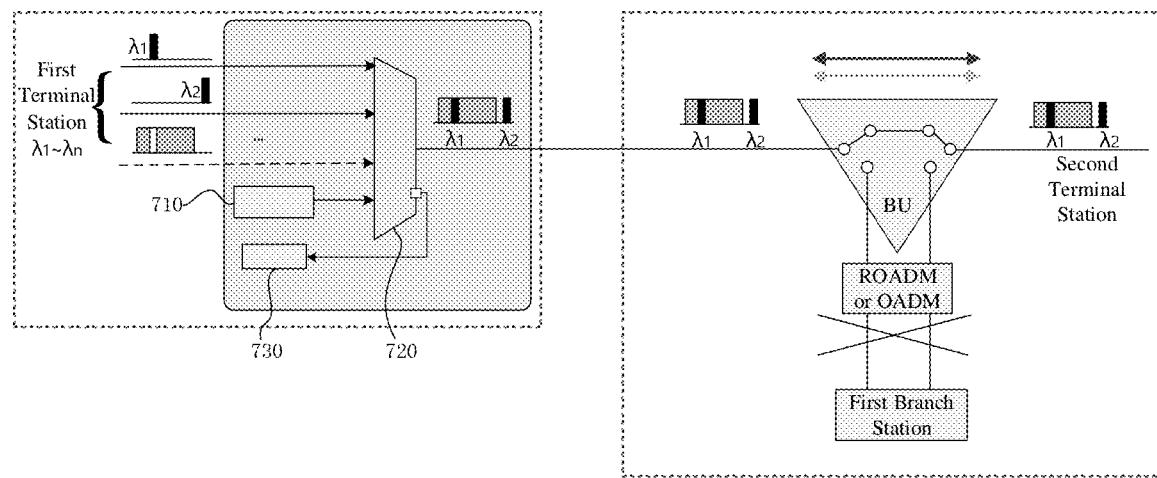
Figure 11:
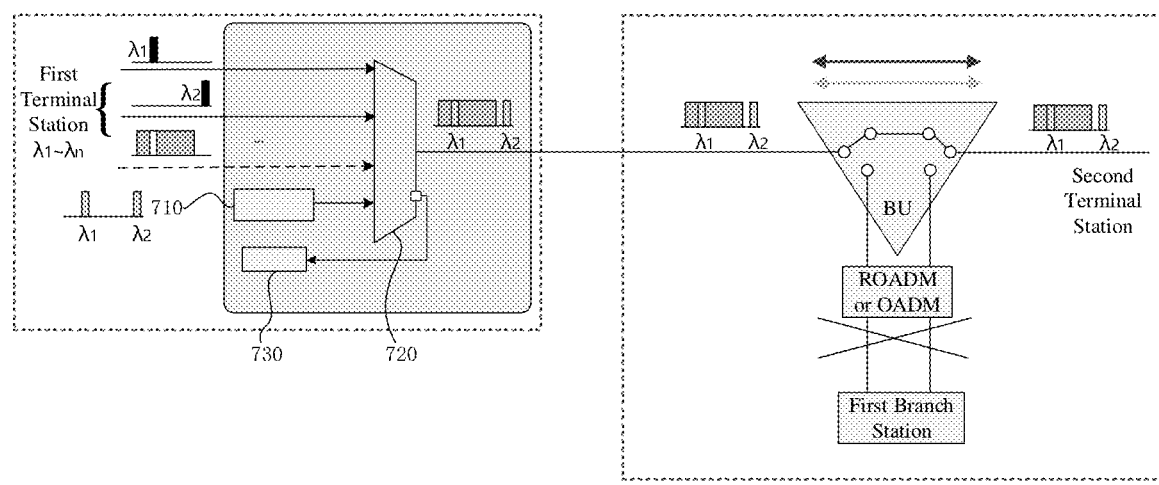

FIG. 9 to FIG. 11 are diagrams of application scenarios of a data secrecy method according to an embodiment of the present application. As shown in FIG. 9, for example, during normal operation of the submarine cable system, the first terminal station transmits optical signals with wavelengths of $\lambda_1 \sim \lambda_n$. After passing through the first branching unit, that is, a BU in FIG. 9, a part of the optical signals are dropped to the first branch station. After receiving optical signals with wavelengths of $\lambda_1$ and $\lambda_2$, the first branch station may modulate the optical signals with these wavelengths, so that the optical signals carry output data of the first branch station to be output. In this case, the wavelength management device 700 detects a state of the first branch in the submarine cable system by a failure detection module 740.

Specifically, the optical signal generation module 710 may be an amplified spontaneous emission (ASE) light source for generating the virtual optical signal. The spontaneous emission light source may have a structure similar to that of an optical amplifier, where particles are excited to a high-energy level by a pump light source, and then spontaneous emission is generated from the excited particles and emit photons. Further, optical signals are formed after the photons are amplified. The foregoing structure is a feasible implementation for the spontaneous emission light source. Specific composition of the spontaneous emission light source is not limited in the present application.

The filtering and combining module 720 is configured to filter out the target optical signal from the first optical signal to obtain a first filtered optical signal; and combine and output the first filtered optical signal with the virtual optical signal. For example, the filtering and combining module 720 may be implemented by a wavelength selective switch (WSS). The wavelength selective switch adopts a free-space optical switching technology, supports a plurality of ports, and supports any wavelength adding and dropping for any port. In this embodiment of the present application, the wavelength selective switch may filter out the target optical signal from the first optical signal based on wavelengths, and may also combine and output the first filtered optical signal with the virtual optical signal.

In some embodiments, in order to reduce changes in power of the optical signal in the submarine cable system, power of the virtual optical signal may also be limited during the process of replacing of the optical signal. Therefore, the wavelength management device 700 further includes a power detection module 730 to determine the power of the virtual optical signal and power of the target optical signal.

For example, a function of the power detection module 730 may be implemented by an optical channel monitoring (OCM) unit. The optical channel monitoring unit may detect the power of the first optical signal transmitted from the first terminal station and the power of the virtual optical signal generated by the optical signal generation module 710. Moreover, to detect the power of the optical signal, the optical channel monitoring unit needs to receive the first optical signal and the virtual optical signal, to perform power detection and transmit a power detection result to the filtering and combining module 720.

It is taken as an example that the wavelength selective switch and the optical channel monitoring unit are used as the filtering and combining module 720 and the power detection module 730, respectively. The optical channel monitoring unit may only be connected to the wavelength selective switch by an optical fiber. After receiving a corresponding optical signal, the wavelength selective switch may drop the optical signal to the optical channel monitoring unit for power detection. In some embodiments, the optical channel monitoring unit may also be connected to the first terminal station, the optical signal generation module 710, and the wavelength selective switch by optical fibers, respectively; respectively receive the first optical signal transmitted from the first terminal station and the virtual optical signal generated by the optical signal generation module 710, and perform power detection on the two signals; and then, transmit a power detection result, along with the first optical signal and the virtual optical signal, to the wavelength selective switch.

As shown in FIG. 10 and FIG. 11, when the first branch is interrupted due to a transmission failure occurring to the first branch in the submarine cable system, the wavelength management device 700 may take the wavelengths of $\lambda_1$ and $\lambda_2$ as the first disaster tolerance set after the failure is detected. Therefore, signals with the wavelengths of $\lambda_1$ and $\lambda_2$ are the target optical signals. Thus, the optical signal generation module 710 is controlled to generate a virtual optical signal corresponding to the first disaster tolerance set, and the filtering and combining module 720 is controlled to perform power control on the virtual optical signal based on the detection result of the power detection module 730. Further, filtering and combining is applied to the first optical signal to replace the optical signal that needs to be transferred to the first branch station with the virtual optical signal that does not carry data, thereby reducing the risks of data leakage.

In some embodiments, after detecting the power of the first optical signal, the power detection module 730 may also transfer the power detection result of the first optical signal to the wavelength management device 700, so that when performing disaster tolerance and determining the first disaster tolerance set due to a transmission failure in the submarine cable system, optical-signal power corresponding to the optical signal in the first disaster tolerance set is added into the first disaster tolerance set. In other words, the first disaster tolerance set includes information of the wavelength and the power of the target optical signal. In this embodiment, after receiving the power of the virtual optical signal, the filtering and combining module 720 may compare the power of the target optical signal in the first disaster tolerance set with the power of the virtual optical signal. If the power of the virtual optical signal is different from that of the target optical signal, the filtering and combining module 720 may be configured to further adjust the power of the virtual optical signal, so that the power of the virtual optical signal is same as that of the target optical signal.

By adjusting the power of the virtual optical signal to be same as that of the target optical signal, the power of the first optical signal may be kept unchanged after the target optical signal is replaced with the virtual optical signal, thereby improving the transmission stability of the submarine cable system. For example, when adjusting the power of the virtual optical signal, the filtering and combining module 720 includes gaining the power of the virtual optical signal and attenuating the power of the virtual optical signal.

It is taken as an example that the optical signal generation module 710 is the spontaneous emission light source and the filtering and combining module 720 is the wavelength selective switch. When the spontaneous emission light source generates the virtual optical signal by the principle of amplified spontaneous emission, the generated optical signal usually has relatively high power, which may be higher than the power of the target optical signal to be replaced. Therefore, in some embodiments, the wavelength selective switch may adjust an attenuation level to reduce the power of the virtual optical signal to the power in the first disaster tolerance set, thereby stabilizing the power of the optical signal transferred in the submarine cable system, and improving system stability of the submarine cable system upon the disaster tolerance.

In some embodiments, the wavelength management device 700 further includes the failure detection module 740. The failure detection module 740 is configured to detect working states of a branch cable of the first branch, the first branch station, and the first branching unit. During normal operation of the submarine cable system, if it is detected by the failure detection module 740 that a failure occurs to any one device of the branch cable, the branch station, and the branching unit, there is a failure in the present branch and disaster tolerance is required. Similarly, upon the disaster tolerance in the submarine cable system, if it is detected by the failure detection module 740 that the branch cable of the first branch, the first branch station, and the first branching unit all operate normally, the failure in the first branch is eliminated and the submarine cable system may be controlled to be recovered to the normal operation by the wavelength management device 700.

It may be learned from the embodiments in the foregoing data secrecy method that, after the disaster tolerance, the first branching unit may also be controlled to perform optical path switching for the first branch. Therefore, in some embodiments, the wavelength management device 700 is further configured to: determine the first branching unit in response to that a failure occurs to the first branch; and control the first branching unit to perform optical path switching to transfer the optical signals corresponding to the respective wavelengths in the first disaster tolerance set to the second terminal station.

As shown in FIG. 9, during the normal operation of the submarine cable system, an optical path of the branching unit is in a state where three ports are interconnected. As shown in FIG. 10 and FIG. 11, after a transmission failure occurs to the first branch, the wavelength management device 700 controls the branching unit to switch the optical path to a state where the first terminal station is directly connected to the second terminal station.

Further, after the failure in the first branch is eliminated, the first branching unit may also be controlled to conduct the first branch to recover a data transmission function of the first branch. Therefore, the wavelength management device 700 is further configured to: in response to failure elimination on the first branch, stop filtering out the target optical signal from the first optical signal, and stop generating the virtual optical signal; and control the first branching unit to perform optical path switching to transfer the target optical signal to the first branch station.

In some embodiments, the wavelength management device 700 is further configured to: determine wavelengths used for optical signals for transfer from the first terminal station to each branch station; and determine a disaster tolerance set corresponding to each branching unit according to the wavelengths used for the optical signals for transfer from the first terminal station to each branch station. The disaster tolerance set corresponding to each branching unit includes at least one wavelength used for the optical signals for transfer from the first terminal station to the branch station connected to the branching unit.

It should be understood that a process of determining the disaster tolerance set corresponding to each branching unit is to obtain the disaster tolerance set corresponding to each branching unit by setting correspondences between the optical signals with different wavelengths transmitted from the first terminal station and different branch stations when the submarine cable system is in normal operation or is not in operation. After the corresponding disaster tolerance set is determined for each branching unit, if a failure occurs to the first branch in the submarine cable system, the corresponding disaster tolerance set may be determined by the first branch unit corresponding to the first branch, which serves as the first disaster tolerance set.

Figure 12:
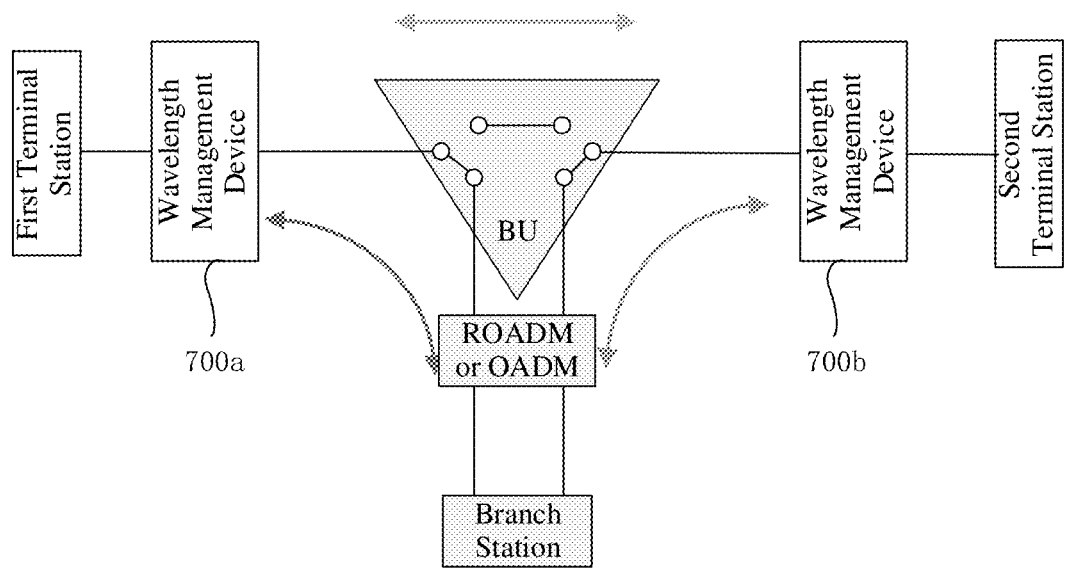
FIG. 12 is a diagram of structures of an application scenario of a wavelength management device according to an embodiment of the present application.

In some embodiments of the present application, there may be a plurality of wavelength management devices 700 that may be disposed at output ends of various terminal station and branch stations in the submarine cable system; or one wavelength management device 700 may be disposed to provide a corresponding data secrecy function for each station. For example, as shown in FIG. 12, the output end of each of the first terminal station and the second terminal station is provided with a wavelength management device 700. The wavelength management device disposed at the output end of the first terminal station is a wavelength management device 700a, and the wavelength management device disposed at the output end of the second terminal station is a wavelength management device 700b. When a failure occurs to the branch station in the submarine cable system, the wavelength management device 700a may replace the optical signal, in the optical signals output from the first terminal station, that needs to be dropped to the branch station with the virtual optical signal; and the wavelength management device 700b may replace the optical signal, in the optical signals output from the second terminal station, that needs to be dropped to the branch station with the virtual optical signal. When a failure occurs to the first terminal station in the submarine cable system, the wavelength management device 700b may adjust the branching unit to a mode in which the branch station and the second terminal station are connected to each other; and replace the optical signal, in the optical signals output from the second terminal station, that needs to be transmitted to the first terminal station with the virtual optical signal. When a failure occurs to the second terminal station in the submarine cable system, the wavelength management device 700a may adjust the branching unit to a mode in which the branch station and the first terminal station are connected to each other; and replace the optical signal, in the optical signals output from the first terminal station, that needs to be transmitted to the second terminal station with the virtual optical signal. In this way, data leakage is avoided.

Figure 13:
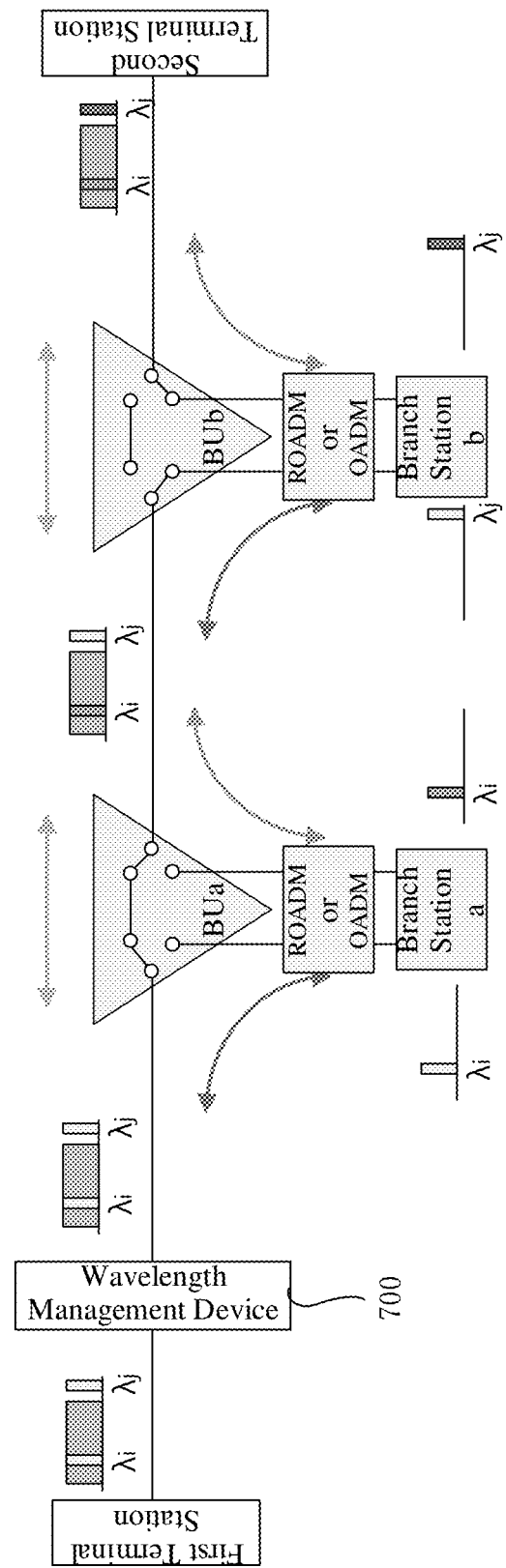
FIG. 13 and FIG. 14 are diagrams of application scenarios of another wavelength management device according to an embodiment of the present application.
Figure 14:
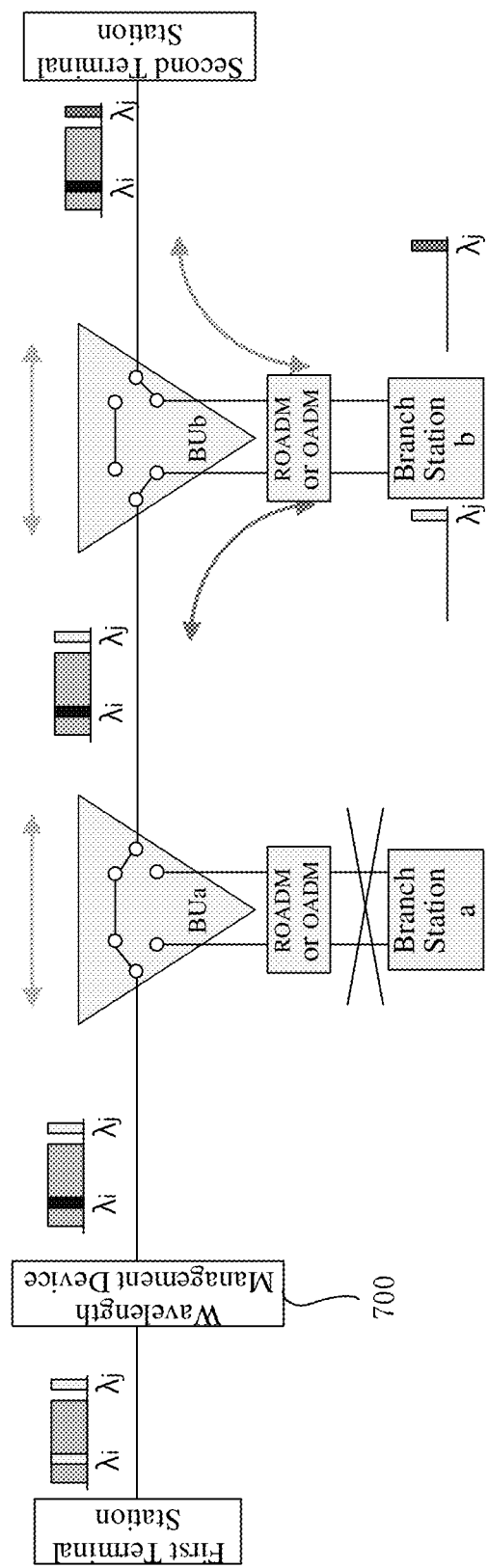

As shown in FIG. 13 and FIG. 14, in some embodiments of the present application, two or more branch stations are disposed in a trunk of the submarine cable system, and each branch station corresponds to a branching unit. In FIG. 13 and FIG. 14, description is made for an example in which two branch stations are disposed in the submarine cable system. The two branch stations are a branch station a and a branch station b, respectively; two branching units are a BUa and a Bub, respectively; the branch station a is connected to the BUa; and the branch station b is connected to the BUb. The first terminal station transmits optical signals with wavelengths of $\lambda_1 \sim \lambda_n$; wavelengths of optical signals received by and transmitted from the branch station a is $\lambda_i$; and wavelengths of optical signals received by and transmitted from the branch station b is $\lambda_j$. i and j, different from each other, are greater than or equal to 1 and less than or equal to n.

As shown in FIG. 13, during the normal operation of the submarine cable system, the first terminal station transmits optical signals with wavelengths of $\lambda_1 \sim \lambda_n$. When passing through the BUa, the optical signal with the wavelength of $\lambda_i$ is dropped to the branch station a; and meanwhile, the branch station a transmits the optical signal with the wavelength of $\lambda_i$ and adds the same to the BUa. It may be learned from the foregoing embodiments that data contents contained in the optical signals received by the branch station a are different from those transmitted from the branch station a. Subsequently, when the optical signals pass through the BUb, the optical signal with the wavelength of $\lambda_j$ is dropped to the branch station b; and meanwhile, the branch station b transmits the optical signal with the wavelength of $\lambda_j$ and adds the same to the BUb. Through being transferred in the submarine cable system, the optical signal transmitted from the first terminal station is enabled to be dropped and replaced at the branch station, for data that needs to be kept in secrecy, before being transmitted to the second terminal station, thereby reducing data leakage in the submarine cable system. Therefore, during the normal operation of the submarine cable system, the wavelength management device 700 may not perform an operation on the optical signals transmitted from the first terminal station. The wavelength management device 700 has only a function of detecting the failure in the system.

When the wavelength management device 700 detects a transmission failure in the branch in the submarine cable system, as shown in FIG. 14, it is detected by the wavelength management device 700 that a transmission failure occurs to the branch on which the branch station a is located so that a communication connection between the branch station a and the BUa is interrupted and the optical signal with the wavelength of $\lambda_i$ transmitted from the first terminal station cannot be dropped to the branch station a through the BUa to be received and modulated. Therefore, the wavelength management device 700 may switch an optical path of the BUa to a mode in which the first terminal station is connected to directly the second terminal station, and replace the optical signal with the wavelength of $\lambda_i$ transmitted from the first terminal station with the virtual optical signal that does not carry data, to prevent data in the optical signal with the wavelength of $\lambda_i$ from being transferred to the second terminal station, thereby improving secrecy effects of the submarine cable system. Similarly, when a transmission failure occurs to a branch corresponding to the branch station b, a processing manner is the same as the foregoing steps, except for the branching unit and the optical signal corresponding to the branch station b in replace of the branching unit and the optical signal corresponding to the branch station a, description of which are not repeated in this embodiment.

It may be learned from the content in the foregoing embodiments that, the present application discloses a data secrecy method for a submarine cable system with a failure and a submarine cable system. The method includes: determining the first disaster tolerance set in response to that a failure occurs to the first branch; and replacing the target optical signal in the first optical signal with the virtual optical signal. The first branch is any branch in the submarine cable system. The first disaster tolerance set includes at least one wavelength used for the optical signals for transfer from the first terminal station to the first branch. The first optical signal is the optical signal output from the first terminal station. The target optical signal includes the optical signals corresponding to the respective wavelengths in the first disaster tolerance set. The virtual optical signal is the optical signal that does not carry data content. According to the method, when performing disaster tolerance due to a failure occurring to the branch in the submarine cable system, by means of determining the wavelength of the optical signal transferred to the first branch and replacing the optical signal with the virtual optical signal that does not carry data information, the submarine cable system may not transfer the optical signal of the first branch to other stations upon the disaster tolerance. In this case, the transmission stability of the submarine cable system upon the disaster tolerance is improved, and the risks of data leakage are reduced.

For similar parts between the embodiments provided in the present application, reference may be made to each other. The specific implementations described above are merely some examples under a general concept of the present application, and do not constitute any limitation to the protection scope of the present application. For a person skilled in the art, any other implementations derived according to the solutions of the present application without an effective effort all fall within the protection scope of the present application.

What is claimed is:

1. A data secrecy method for a submarine cable system with a failure, applicable to a submarine cable system, wherein the submarine cable system comprises:
 a first terminal station, a second terminal station, a trunk submarine cable connected between the first terminal station and the second terminal station, and at least one branching unit disposed on the trunk submarine cable, wherein each of the least one branching unit is connected to one branch, and each branch comprises a branch submarine cable connected to the branching unit and a branch station connected to the branch submarine cable, wherein the method comprises:
 determining a first disaster tolerance set in response to that a failure occurs to a first branch, wherein the first branch is any branch in the submarine cable system, the first disaster tolerance set comprises at least one wavelength used for optical signals for transfer from the first terminal station to a first branch station, and the first branch station is a branch station on the first branch; and
 replacing a target optical signal in a first optical signal with a virtual optical signal, wherein the first optical signal is an optical signal output from the first terminal station, the target optical signal comprises optical signals corresponding to the respective wavelengths in the first disaster tolerance set, the virtual optical signal is an optical signal that does not carry data content, and the virtual optical signal has a wavelength same as that of the target optical signal.

2. The data secrecy method for a submarine cable system with a failure according to claim 1, wherein the replacing a target optical signal in a first optical signal with a virtual optical signal comprises:
 filtering out the target optical signal from the first optical signal to obtain a first filtered optical signal;
 generating the virtual optical signal; and
 combining and outputting the first filtered optical signal with the virtual optical signal.

3. The data secrecy method for a submarine cable system with a failure according to claim 2, wherein after the generating the virtual optical signal, the method further comprises:
 determining power of the target optical signal and power of the virtual optical signal; and
 if the power of the virtual optical signal is different from that of the target optical signal, adjusting the power of the virtual optical signal, so that the power of the virtual optical signal is same as that of the target optical signal.

4. The data secrecy method for a submarine cable system with a failure according to claim 1, wherein the replacing a target optical signal in a first optical signal with a virtual optical signal further comprises:
 determining a first branching unit in response to that a failure occurs to the first branch, wherein the first branching unit is a branching unit connected to the first branch; and
 controlling the first branching unit to perform optical path switching to transfer the optical signals corresponding to the respective wavelengths in the first disaster tolerance set to the second terminal station.

5. The data secrecy method for a submarine cable system with a failure according to claim 4, wherein after the controlling the first branching unit to perform optical path switching to transfer the optical signals corresponding to the respective wavelengths in the first disaster tolerance set to the second terminal station, the method further comprises:
 in response to failure elimination on the first branch, stopping filtering out the target optical signal from the first optical signal, and stopping generating the virtual optical signal; and
 controlling the first branching unit to perform optical path switching to transfer the target optical signal to the first branch station.

6. The data secrecy method for a submarine cable system with a failure according to claim 1, wherein before the determining a first disaster tolerance set in response to that a failure occurs to a first branch, the method further comprises:
 determining wavelengths used for the optical signals for transfer from the first terminal station to each branch station; and
 determining a disaster tolerance set corresponding to each branching unit according to the wavelengths used for the optical signals for transfer from the first terminal station to each branch station, wherein the disaster tolerance set corresponding to each branching unit comprises at least one wavelength used for the optical signals for transfer from the first terminal station to the branch station connected to the branching unit.

7. The data secrecy method for a submarine cable system with a failure according to claim 1, wherein that the failure occurring to the first branch comprises at least one of a failure occurring to the branch submarine cable on the first branch, a failure occurring to the first branch station, and a failure occurring to the first branching unit.

8. A submarine cable system, comprising a first terminal station, a second terminal station, a trunk submarine cable connected between the first terminal station and the second terminal station, and at least one branching unit disposed on the trunk submarine cable, wherein each of the least one branching unit is connected to one branch, and each branch comprises a branch submarine cable connected to the branching unit and a branch station connected to the branch submarine cable; and the submarine cable system further comprises:

a wavelength management device, disposed on an outgoing-light side of the first terminal station, wherein
the wavelength management device is configured to:
determine a first disaster tolerance set in response to that a failure occurs to a first branch, wherein the first branch is any branch in the submarine cable system, the first disaster tolerance set comprises at least one wavelength used for optical signals for transfer from the first terminal station to a first branch station, and the first branch station is a branch station on the first branch; and
replace a target optical signal in a first optical signal with a virtual optical signal, wherein the first optical signal is an optical signal output from the first terminal station, the target optical signal comprises optical signals corresponding to the respective wavelengths in the first disaster tolerance set, the virtual optical signal is an optical signal that does not carry data content, and the virtual optical signal has a wavelength same as that of the target optical signal.

9. The submarine cable system according to claim 8, wherein the wavelength management device comprises:
an optical signal generation module, configured to generate the virtual optical signal; and
a filtering and combining module, configured to filter out the target optical signal from the first optical signal to obtain a first filtered optical signal; and combine and output the first filtered optical signal with the virtual optical signal.

10. The submarine cable system according to claim 9, wherein the wavelength management device further comprises:

a power detection module, configured to determine power of the target optical signal and power of the virtual optical signal; and
the filtering and combining module is further configured to: if the power of the virtual optical signal is different from that of the target optical signal, adjust the power of the virtual optical signal, so that the power of the virtual optical signal is same as that of the target optical signal.

11. The submarine cable system according to claim 8, wherein the wavelength management device is further configured to:
determine a first branching unit in response to that a failure occurs to the first branch, wherein the first branching unit is a branching unit connected to the first branch; and
control the first branching unit to perform optical path switching to transfer the optical signals corresponding to the respective wavelengths in the first disaster tolerance set to the second terminal station.

12. The submarine cable system according to claim 11, wherein the wavelength management device is further configured to:
in response to failure elimination on the first branch, stop filtering out the target optical signal from the first optical signal, and stop generating the virtual optical signal; and
control the first branching unit to perform optical path switching to transfer the target optical signal to the first branch station.

13. The submarine cable system according to claim 8, wherein the wavelength management device is further configured to:
determine wavelengths used for the optical signals for transfer from the first terminal station to each branch station; and
determine a disaster tolerance set corresponding to each branching unit according to the wavelengths used for the optical signals for transfer from the first terminal station to each branch station, wherein the disaster tolerance set corresponding to each branching unit comprises at least one wavelength used for the optical signals for transfer from the first terminal station to the branch station connected to the branching unit.

14. The submarine cable system according to claim 8, wherein the wavelength management device further comprises:
a failure detection module, configured to detect working states of a branch cable of the first branch, the first branch station, and the first branching unit.

\* \* \* \* \*